United States Patent [19]

Deverrewaere

[11] 4,186,428

[45] Jan. 29, 1980

[54] DEVICE FOR ADJUSTING THE INCLINATION OF AUTOMOBILE HEADLIGHTS

[75] Inventor: Alain Deverrewaere, La Varenne, France

[73] Assignee: Cibie Projecteurs, Bobigny, France

[21] Appl. No.: 882,842

[22] Filed: Mar. 2, 1978

[30] Foreign Application Priority Data

Mar. 25, 1977 [FR] France .................................. 77 08981

[51] Int. Cl.² .............................................. F21M 3/22
[52] U.S. Cl. .................................... 362/66; 362/233; 362/251; 362/272; 362/274; 362/286; 362/386; 362/420
[58] Field of Search ....................... 362/53, 55, 66, 67, 362/69, 233, 250, 251, 272, 284, 285, 286, 386, 418, 420, 428, 40; 315/82

[56] References Cited

U.S. PATENT DOCUMENTS

| 3,229,082 | 1/1966 | Barron | 362/233 |
| 4,013,883 | 3/1977 | Andres | 362/385 |

*Primary Examiner*—Howard A. Birmiel
*Attorney, Agent, or Firm*—Cullen, Sloman, Cantor, Grauer, Scott, & Rutherford

[57] ABSTRACT

The invention relates to a device for the joint control of the inclination of the headlights of an automobile, of the type comprising an electric motor-reduction gear mechanically coupled to each headlight to adjust the inclination thereof, each motor-reduction gear being of the type comprising, in series in its electrical supply circuit, an electrical switch actuated generator that the motor-reduction gear makes a predetermined rotation, and comprising a time base possessing at least one output and capable of supplying in controlled manner on said output a series of electrical pulses at intervals of time at least equal to the time necessary for the motor-reduction gears to make said predetermined rotation.

3 Claims, 6 Drawing Figures

DEVICE FOR ADJUSTING THE INCLINATION OF AUTOMOBILE HEADLIGHTS

BACKGROUND OF THE INVENTION

The present invention relates to the adjustment of the inclination of the headlights of an automobile.

More precisely, it proposes a semi-automatic system of adjustment in which the corrections of the inclination of the headlights are obtained by means of motor-reduction gears.

French Pat. No. 1 259 442 in particular discloses a type of automatic adjustment in which a headlight is fixed on a base movable about a horizontal axis of rotation, said base being provided with a threaded recess in which is placed a threaded extension coupled to the shaft of a servomotor, the headlights then being moved simultaneously by a mechanical cable or connecting rod system or a hydraulic system.

A major drawback of devices of this type resides in the fact that, if in fact the headlight directly associated with the servomotor is suitably adjusted, the controlled adjustment of the second headlight may not be precise due to the device connecting the two headlights together.

SUMMARY OF THE INVENTION

The present invention therefore relates to the devices associating, in known manner, a motor-reduction gear with each of the headlights and, to overcome the lack of precision in adjustment, it proposes to synchronize the running of the two motor-reduction gears. To this end, and to ensure that the two motor-reduction gears make the same rotation, it proposes to use motors with fixed stopping such as those used in windscreen wiper motors and to control these motors with the aid of pulses furnished by a generator. Moreover, it provides that the motors may rotate in both directions by means of a reverser, in order to control both the raising and lowering of the illuminating beam.

In this way, each motor receiving the same number of pulses and making after each pulse the same number of rotations ensures a correct and identical adjustment of the two headlights simultaneously.

The invention will be more readily understood on reading the following description with reference to the accompanying drawings, in which.

DETAILED DESCRIPTION OF AN EMBODIMENT OF THE INVENTION

Figure 1:
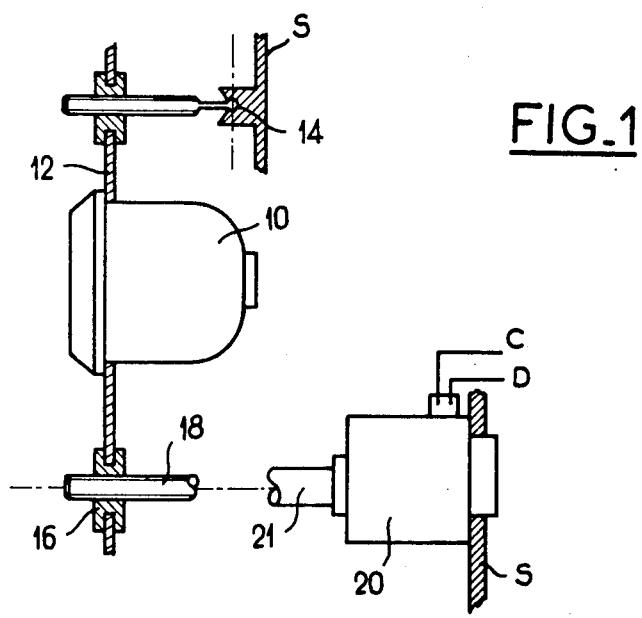
FIG. 1 shows a schematic section through a headlight and the motor-reduction gear associated therewith.
Figure 2:
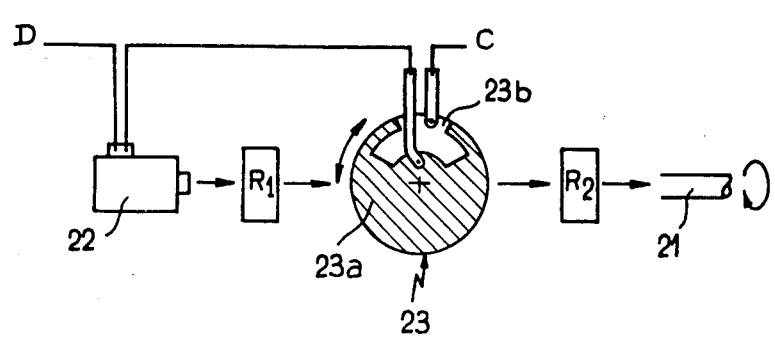
FIG. 2 is a schematic exploded view of a motor-reduction gear and the elements of which it is composed.

Referring now to the drawings, FIG. 1 schematically shows an automobile headlight 10 and the motor-reduction gear 20 associated therewith. The headlight 10 is mounted on a support 12 for rotation about a horizontal axis 14 fixed with respect to a base S or to a part of the bodywork. At a point of the support not located on this axis of rotation, the support 12 is provided with a threaded recess which may be made directly on the support or be formed by a nut 16 fixed on the support. The nut 16 receives the threaded extension 18 of the shaft 21 of the motor-reduction gear 20 associated therewith, said motor-reduction gear itself being fixed in the base S. Each motor-reduction gear, as indicated summarily in FIG. 2, comprises a motor 22 driving a fixed stop disc 23 by means of a gear train R1, the fixed stop disc 23 comprising a conducting area 23a and a gap 23b in this area, said disc being capable of cutting off the supply of the motor after a determined number of revolutions thereof. A second gear train R2 finally drives the driven shaft 21 of the motor-reduction gear. When the motor is in rotation, the nut 16 moves longitudinally along the threaded extension 18 of the shaft 21, thus driving the support 12 of the headlight in rotation. Due to suitable reduction ratios, the motor-reduction gear is capable of producing a very precise adjustment of the headlights.

Figure 3:
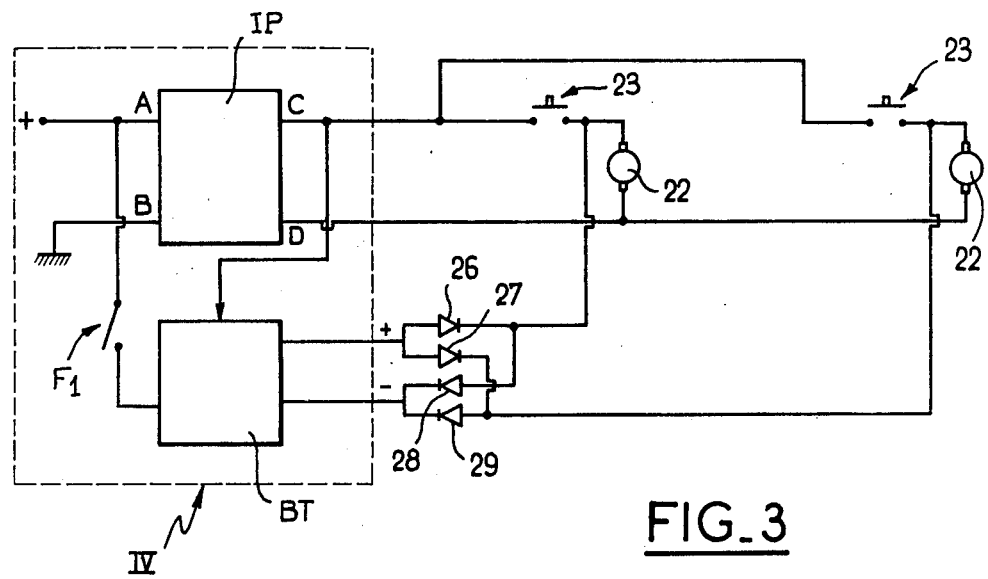
FIG. 3 shows the control circuit of the motor-reduction gears.

FIG. 3 shows the diagram of the electrical circuit for the synchronized control of the motor-reduction gears.

Each motor-reduction gear, comprising in particular a motor 22 and a fixed stop disc 23 acting as motor supply switch, is of the type with two directions of rotation and two wires. The motor-reduction gears are connected in parallel to the two outputs C, D of a polarity switch IP whose inputs A, B are themselves connected to the + terminal of a battery and to ground.

The interposition of a polarity switch on the motor supply circuit makes it possible, according to the state of switching of the switch, to rotate the motor-reduction gears in one direction or the other so as to be able to control both the raising and lowering of the headlight beam. The control circuit further comprises, in series with a base-switch $F_1$, a generator BT capable of supplying rectangular signals at predetermined time intervals, said generator being connected to the output C of the switch so as to take into account the state of the polarity switch. The generator BT further comprises two outputs noted "+ output" and "− output", only one of these outputs being effective as a function of the state of the switch, each output, when it is effective, being able to supply rectangular signals at said predetermined time intervals. An electrical connection is provided between each output of the generator and the points of the circuit located between the disc 23 and a terminal of the motor 22 of each motor-reduction gear 20. Thus, the + output of the generator BT is connected by two diodes 26 and 27 to the mentioned points of the circuits of the two motors respectively. The − output of the generator is connected by two diodes 28 and 29 (mounted in reverse with respect to the first) to the same two points.

Figure 4:
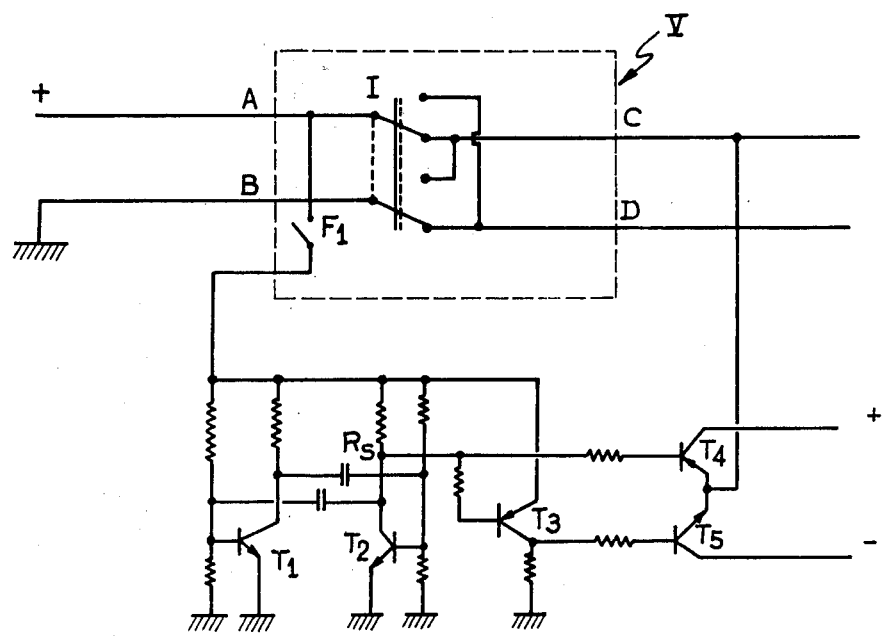
FIG. 4 is a more detailed diagram of part IV of FIG. 3.

FIG. 4 is a schematic representation of the switch-base switch-generator assembly. According to the state of a two-positioned switch I, the terminals A and B may be connected respectively to C and D or to D and C.

Figure 6:
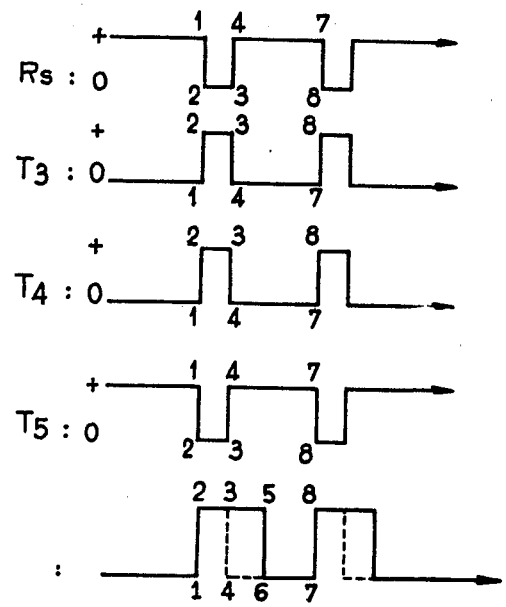
FIG. 6 shows the functioning in time of elements constituting the electrical diagram of FIG. 3.

The switch $F_1$ controls the starting and stopping of the generator BT, which is constituted as follows:

It comprises two transistors T1, T2, mounted as non-symmetrical astable multivibrator, capable of supplying to an output point Rs rectangular signals as indicated in FIG. 6, a pnp type transistor T3 whose base is connected to the output Rs of the multivibrator, the emitter of which is connected to one of the terminals of the switch F₁. The collector of the transistor T3 may therefore emit rectangular signals as indicated in FIG. 6, said rectangular signals being complementary of the signals emitted by Rs. Finally, the generator comprises a pnp type transistor T4 and npn type transistor T5, the emitters of which are connected to the output C of the switch, the collectors being respectively the + and − outputs of the generator, whilst the base of T4 is directly connected to Rs, the base of T5 being connected to the collector of T3. If the output C is connected to the input A in the switch, the npn type transistor Ts will be blocked, only transistor T4 will emit signals as indicated in FIG. 6 in symmetrical manner if the output C is connected to the input B in the switch, the transistor T4 will be blocked, the transistor T5 emitting signals such as indicated in FIG. 6.

The functional diagram of the motor as a function of time is explained in FIG. 6 in which the following stages may be distinguished:

1-2 arrival of the signal from T4 or T5 on the fixed stop 23

2-3 short-circuit of the fixed stop and rotation of the motor bringing about the rotation of the fixed stop disc 23. The terminal C crosses the whole of the conducting area 23a of the disc up to the date noted 5 on the diagram.

3-4 stopping of the signal from the generator.

4-5 the terminal G crossing the conducting area 23a, the fixed stop disc ensures supply of the motor 5-6 stopping of the motor after the terminal G of the fixed stop coincides with the insulating area 23b of the fixed stop disc.

6-7 stopping time of the motor awaiting the new signal 7-8.

It is necessary that the time 1-7 separating two signals emitted by the generator be greater than the time necessary for the revolution of the fixed stop disc of each motor-reduction gear. Each motor-reduction gear is thus certain to make the same number of revolutions at each signal. The minimum width of the insulating area 23b is determined by the number of revolutions made by the motor once its supply is cut off, in order that the motor cannot be resupplied before its complete stop by the arrival of the terminal C of the disc on the conducting area 23a. Thus, once it is certain that the motor has stopped, it is possible to start its rotation with the aid of a rectangular signal emitted by the generator, the supply then being relayed until the new stopping by the conducting area 23b of the disc 23 rotating with the motor.

Figure 5:
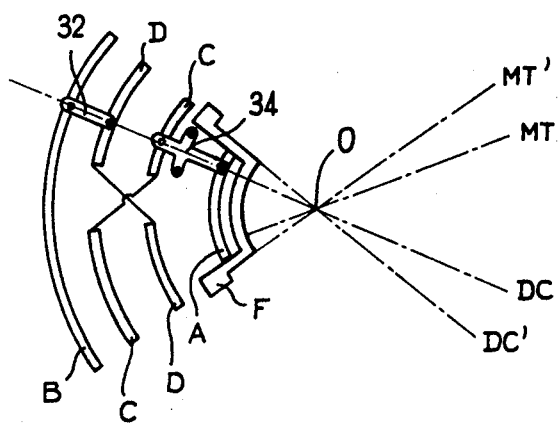
FIG. 5 is a particular embodiment of part V of the diagram of FIG. 4.

FIG. 5 shows a particular embodiment of the polarity switch-base switch assembly. The unit as is presented is composed of a printed circuit with five tracks A, B, C, D, F, switchable by conducting segments 32 and 34 rotating together about a point 0. Four states are possible and illustrated schematically by the lines of axis MT', MT, DC, DC'.

In states DC and DC', the tracks B and D are connected by segment 32 and A and C by segment 34; moreover, in state DC', the conducting segment 34 ensures the electrical connection between the tracks A and F, thus producing the closure of the switch F of the block diagram of FIG. 3 and the control of the generator. Similarly, in the states MT and MT', the segment 32 connects the tracks B and C, and segment 34 connects tracks A and D. It further connects tracks A and F in the state MT'.

The unit as shown in FIG. 5 is intended to be fixed on the dashboard so that the driver of the vehicle provided with such a headlight adjusting system can proceed with said adjustment manually. The segments 32 and 34 may be fast with an arm of the unit pivoting about 0.

The control of the generator BT is ensured during the whole time that the unit is in state MT' or DC'. Moreover, an automatic return of positions MT' to MT and DC' to DC may advantageously be provided.

Finally, the unit may be produced simply with conventional elements comprising a polarity switch with two stable positions and a separate push element F₁.

It will readily be understood that such a type of control providing a motor element associated with each headlight enables a very precise synchronized adjustment of the inclination of the headlights to be effected.

I claim:

1. In a device for the joint control of the inclination of the headlights of an automobile, including a pair of motor reduction gears mechanically coupled to a pair of headlights, respectively, an electrical circuit including an electrical supply and main switch, the improvement comprising;

a fixed stop switch on each motor reduction gear, said fixed stop switch turning off only when a shaft of the motor reduction gear is positioned according to a predetermined angular sector;

a generator adapted to supply electrical pulses sufficient to start rotation of the motor reduction gears, from their stop position until the closure of the fixed stop switches, the output of the generator being electrically connected between the fixed stop switches and their corresponding motor reduction gears;

the generator being connected to the electrical supply by the main switch.

2. In the device of claim 1, wherein said electrical supply circuit of the motor reduction gears further comprises a polarity switch;

and wherein said generator has two outputs of opposite polarities connected to said polarity switch so that only one of its outputs is effective according to the state of said polarity switch;

with each output being electrically connected to each of said motor reduction gears through a pair of diodes;

said diodes corresponding to an output being in the same direction but opposite to the direction of the diodes corresponding to the other output.

3. In the device of claim 2, said generator delivering a square wave signal.

* * * * *